US012024344B2

(12) United States Patent
Kim

(10) Patent No.: US 12,024,344 B2
(45) Date of Patent: Jul. 2, 2024

(54) PAPER HANDLE FOR BOX, AND MANUFACTURING METHOD THEREFOR

(71) Applicant: DONG BANG PLUS PAPER, Paju-si (KR)

(72) Inventor: Soung Yeob Kim, Seoul (KR)

(73) Assignee: DONG BANG PLUS PAPER, Gyeonggi-Do (KR)

( * ) Notice: Subject to any disclaimer, the term of this patent is extended or adjusted under 35 U.S.C. 154(b) by 242 days.

(21) Appl. No.: 17/439,796

(22) PCT Filed: Mar. 19, 2020

(86) PCT No.: PCT/KR2020/003734
§ 371 (c)(1),
(2) Date: Sep. 15, 2021

(87) PCT Pub. No.: WO2020/190040
PCT Pub. Date: Sep. 24, 2020

(65) Prior Publication Data

US 2022/0169416 A1 Jun. 2, 2022

(30) Foreign Application Priority Data

Mar. 19, 2019 (KR) ........................ 10-2019-0031100

(51) Int. Cl.
*B65D 5/46* (2006.01)
*B31B 50/86* (2017.01)
*B31B 105/00* (2017.01)

(52) U.S. Cl.
CPC .......... *B65D 5/46024* (2013.01); *B31B 50/86* (2017.08); *B31B 2105/00* (2017.08)

(58) Field of Classification Search
CPC ........................ B65D 5/46024; B65D 5/46032
See application file for complete search history.

(56) References Cited

U.S. PATENT DOCUMENTS 2,605,041 A * 7/1952 Welshenbach ..... B65D 5/46032 229/117.19
2,807,407 A * 9/1957 Van Rosen ........ B65D 5/46032 229/117.26

(Continued)

FOREIGN PATENT DOCUMENTS

CN 203845136 U 9/2014
JP S63-32119 U 3/1986

(Continued)

OTHER PUBLICATIONS

First Office Action, included in the Extended European Search Report, European Patent Office, Application No. 20773071.4, dated Mar. 18, 2022, 8 pages.

(Continued)

*Primary Examiner* — Shawn M Braden
(74) *Attorney, Agent, or Firm* — Quarles & Brady LLP

(57) ABSTRACT

The present invention relates to a paper handle for a box, and a manufacturing method therefor. In order to implement this, the present invention has a box handle which has a holding part formed in the center of a body, and which has catching parts formed at both facing sides thereof so as to be insertedly fixed to fitting holes of a packaging box, wherein the body is folded at a predetermined width to form at least two layers so that both the long-side ends thereof face each other, and the catching parts are respectively formed on both short sides of the body and comprise a first wing part and a second wing part, which are continuous, formed by folding a plurality of points, having predetermined intervals in the longitudinal direction of the long side, orthogonally to the long side.

7 Claims, 9 Drawing Sheets

(56) References Cited

U.S. PATENT DOCUMENTS

| | | | | | |
|---|---|---|---|---|---|
| 2,853,224 | A * | 9/1958 | Slater | B65D 5/46032 229/125.21 |
| 2,918,206 | A * | 12/1959 | Kleingers, Jr. | B65D 5/46024 229/117.22 |
| 3,053,432 | A * | 9/1962 | Arneson | B65D 5/46032 229/117.14 |

FOREIGN PATENT DOCUMENTS

| | | |
|---|---|---|
| KR | 2019840006719 | 3/1986 |
| KR | 2019860000341 | 3/1987 |
| KR | 2019870005208 | 4/1987 |
| KR | 2019880004845 | 4/1988 |
| KR | 2019890007972 | 1/1991 |
| KR | 2019900002245 | 9/1991 |
| KR | 2019900012085 | 3/1992 |
| KR | 2019910015533 | 4/1993 |
| KR | 2019920005471 | 11/1993 |
| KR | 2019950025333 | 4/1997 |
| KR | 2019960000046 | 8/1997 |
| KR | 2019980028779 | 12/1998 |
| KR | 2019970015604 | 1/1999 |
| KR | 10-2013-0001080 A | 7/2013 |
| KR | 20-2014-0002825 U | 5/2014 |
| KR | 2020120010046 | 5/2014 |
| WO | WO 2004/060757 | 7/2004 |
| WO | WO-2004/060757 A1 | 7/2004 |

OTHER PUBLICATIONS

International Search Report and Written Opinion dated Jun. 25, 2020 from PCT/KR2020/003734.

* cited by examiner (a)

(b)

(a)

(b)

(a)

(b)

PAPER HANDLE FOR BOX, AND MANUFACTURING METHOD THEREFOR

CROSS-REFERENCE TO RELATED APPLICATIONS

This application claims priority to and is a 35 U.S.C. § 371 national phase application of PCT/KR2020/003734, filed on Mar. 19, 2020, entitled "PAPER HANDLE FOR BOX, AND MANUFACTURING METHOD THEREFOR", which claims priority to patent application 10-2019-0031100 filed on Mar. 19, 2019 in the Republic of Korea and is incorporated herein by reference in its entirety.

TECHNICAL FIELD

The present invention relates to paper handle for a box, and more particularly, to a paper handle for a box and a manufacturing method therefor, wherein a handle is made by paper folded and is connected to a box so as to be used in carrying the box.

BACKGROUND ART

In general, packing boxes for storing goods, such as coffee or food are usually made of a paper material for such reasons of ease in manufacturing and cost reduction. Most of packing boxes have handles at predetermined parts thereof, preferably, at upper parts of the packing boxes, in order to enhance portability.

Such packing boxes having handles at the upper portion are typically classified into two forms. One of the two forms is a form that both sides of a handle panel made of synthetic resin are temporarily fixed to an upper portion of the packing box. For instance, Korean Utility Model Application Nos. 1984-6719, 1985-11631, 1986-341, 1988-4845, 1989-7972, 1990-12085, 1991-15533, and 1997-15604 disclose such packing boxes. Because such technology requires not only a paper material but also a synthetic resin material, the conventional packing box has several disadvantages in that manufacturing costs increase, a process of assembling a handle is added, a user must separate the handle made of synthetic resin from the packing box made of paper in order to discard the packing box, and the handle made of synthetic resin pollutes environment when the handle is discarded. So, the handle made of synthetic resin is forbidden in use.

Moreover, the other form is a form that a packing box made of paper has a handle-shaped hole formed at an upper portion of the packing box and a covering surface having the handle-shaped hole is erected and fixed at right angles to the upper surface of the packing box so that a handle made of not synthetic resin but paper is formed orthogonally at the upper end of the packing box. For instance, Korean Utility Model Application Nos. 1992-5471, 1990-2245, 1995-25333, 1996-46, and 1998-28779 disclose such packing boxes. Such conventional packing boxes achieve the purpose of reduction of manufacturing costs since excluding the handle made of synthetic resin. However, such conventional packing boxes have a disadvantage in that packing boxes cannot be loaded in multiple layers in the state where the handle is formed. Therefore, the packing boxes are delivered in a state where the handles are not formed in a packaging step which is a step before delivery of products, and then, a consumer who purchased the packing box has to make the handle. So, the conventional packing boxes have a negative effect of shifting a complex process of forming the handle to consumers.

DISCLOSURE

Technical Problem

Accordingly, the present invention has been made in an effort to solve the above-mentioned problems occurring in the prior arts, and it is an object of the present invention to provide a paper handle for a box and a manufacturing method therefor, which can form a eco-friendly handle, which is made of paper and is formed by being folded with durability necessary for carrying a box, so that there is no need to separate the handle from the packing box in order to discard the packing box, thereby preventing environmental pollution since being recyclable.

The technical problem to be solved by the present invention is not limited to the technical problem as mentioned above, and another technical problem, which is not mentioned, could be clearly understood by those having ordinary skill in the art to which the present invention pertains based on the description below.

Technical Solution

To achieve the above objects, the present invention provides a paper handle for a box, which includes a holding part formed at the center of a body and catching parts formed at both facing sides, wherein the body has both long sides folded at a predetermined width to form at least two layers so that ends of the long sides face each other, and the catching parts are respectively formed at both short sides of the body and each of the catching parts comprises a first wing part and a second wing part which are extended to each other and are formed when a plurality of points spaced apart at predetermined intervals in a longitudinal direction of the long sides are folded to be at right angles to the long sides.

In another aspect of the present invention, the present invention provides a manufacturing method of a paper handle for a box including:

- a first step of forming a first folding line and a second folding line, which are spaced apart inwardly from the ends of the long sides of a body made of paper and formed in a rectangular shape having long sides and short sides,
- and forming third folding lines, fourth folding lines, fifth folding lines, and sixth folding lines which are formed at both short sides of the body to be symmetric, are formed toward the short sides from the center of the body at predetermined intervals in sequence to be at right angles to the long sides;
- a second step of folding ends of the long sides of the body inwardly along the first folding line and the second folding line;
- and a third step of bending the short sides upwardly along the third folding line after the second step, bending the short sides downwardly along the fourth folding line, bending the short sides upwardly along the fifth folding line, and bending the short sides downwardly along the sixth folding line.

In the third step, the facing inner surfaces of the short sides are bonded together while the short sides are bent upwardly along the third folding line and bent downwardly along the fourth folding line.

Advantageous Effects

The paper handle for a box and the manufacturing method therefor according to the present invention have the following effects.

That is, since the handle necessary for carrying the paper box is made of paper, a user can discard the box and the handle together without needing to separate the handle from the paper box after using the box. Therefore, the paper handle for a box and the manufacturing method therefor according to the present invention is eco-friendly since being recyclable, is easy to manufacture by being simply folded, and allows the user to adjust strength of the handle in various ways according to weight of the box.

In addition, since the effect of the present invention described above is expected to be exerted by the constitution of the contents regardless of whether or not the inventor perceives it, the above-mentioned effect has several effects according to the contents described, and it should not be recognized that the inventor described all existing or grasped effects.

Furthermore, the effect of the present invention should be grasped further by the entire description of the specification, and even if it is not described in explicit sentences, a person having ordinary skill in the art to which the written description belongs, it should be seen as an effect described in this specification.

MODE FOR INVENTION

Figure 1:
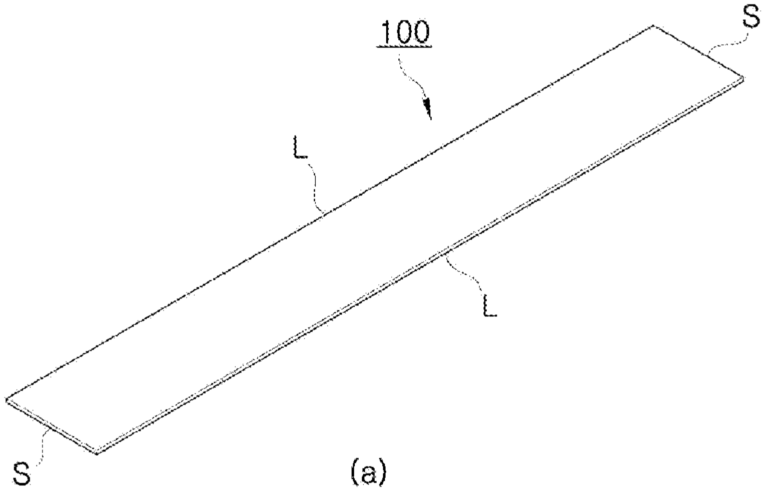
FIGS. 1(*a*) and (*b*) are perspective views illustrating states before and after a paper handle according to an embodiment of the present invention is formed.
Figure 1:
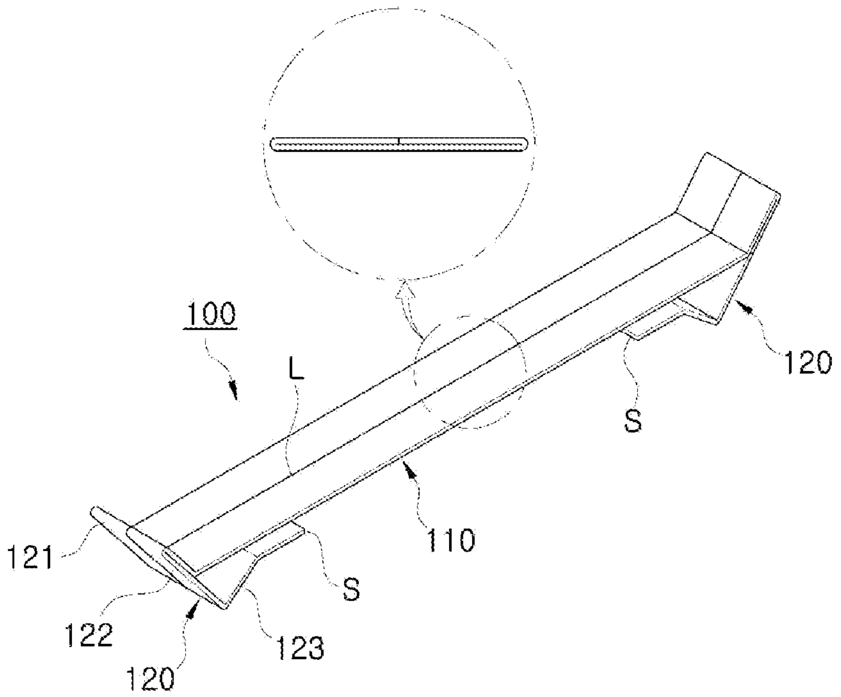

Hereinafter, a configuration and an operation according to preferred embodiments of the present invention will be described in detail with reference to the accompanying drawings.

Such embodiments of the present invention are to describe the present invention in detail such that those skilled in the art can implement the present invention easily, and the technical idea and scope of the present invention are not limited to the embodiments described herein.

Moreover, in assigning reference numerals to components in each drawing, it shall be noted that like components have like reference numerals as much as possible even if illustrated in different drawings. Furthermore, the terms specifically defined in consideration of the configuration and operation of the present invention may be changed depending on the intention or practice of a user and an operator. The terms should be defined based on all contents in the specification.

A paper handle for a box according to an embodiment of the present invention includes a body made of paper, a holding part which is formed at the center, and catching parts which are respectively formed at both facing sides thereof based on the holding part when the body is folded and which is fit and fixed into fitting holes formed in the box. Hereinafter, preferred embodiments of the invention will be described with reference to the accompanying drawings.

First, as illustrated in FIG. 1(*a*), the body 100 has a predetermined length, and is formed in a rectangular shape having long sides (L) and short sides (S).

As illustrated in FIG. 1(*b*), when the body 100 is folded, the holding part 110 allowing a user to hold the handle in the user's hand is formed at the center, and the catching parts 120 are formed at both facing sides of the body 100 to be symmetric with each other. Such catching parts 120 are inserted into fitting holes 310 formed in any one side of a box 300, and then, are fixed in the fitting holes 310.

The body 100 may be made of synthetic resin with flexibility, but it is preferable to be made of an eco-friendly material with flexibility. The eco-friendly material may be biodegradable plastics, but may be paper with various forms which is capable of being easily put out together with paper boxes. Such paper has predetermined strength like craft paper or paper boards.

As illustrated in FIG. 1(*b*), end portions of both long sides (L) of the body 100 are folded inwardly or outwardly at a predetermined width to form at least two layers when the body 100 is viewed from the side. When the end portions of both long sides (L) of the body 100 are folded inwardly or outwardly, they may be folded in a series of zigzags so as to form at least three layers when the body 100 is viewed from the side.

For reference, the paper has grain, which is an arrangement state of fiber shown in a progress direction of a machine when pulp is made into paper. The grain is divided into a machine direction (MD) which is a direction that paper is made and a cross direction (CD) which meets the machine direction at right angles.

Therefore, if the long sides (L) of the body 100 is determined in consideration of the grain of paper, the body 100 can have more strength.

When the end portions of both long sides (L) of the body 100 are folded inwardly or outwardly at the predetermined width, the ends of the long sides (L) of the body 100 are folded to coincide with each other so that strength of the body 100 is distributed evenly overall, are folded not to coincide with each other, namely, to be separated from each other so that the edge of the body 100 is stronger than the central part of the body 100, or are folded in such a way that any one of the ends of the long sides is lapped over or below the other end so that the central part of the body 100 is stronger than the edge of the body 100.

Figure 2:
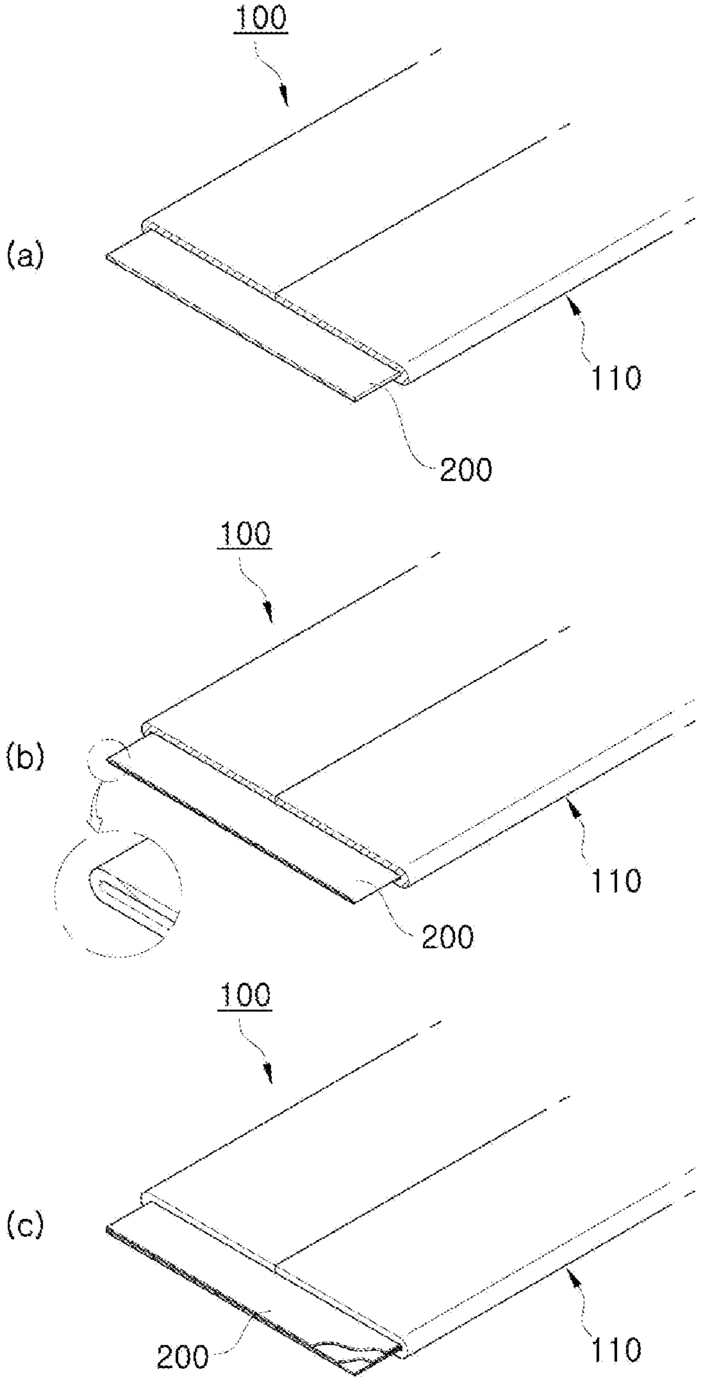
FIGS. 2(*a*), (*b*) and (*c*) are perspective views illustrating a core which is mounted in the paper handle according to an embodiment of the present invention.

FIG. 2 illustrates another example to increase strength of the body 100. As illustrated in FIG. 2, a core 200 is put on the body 100, and then, the ends of the long sides (L) of the body 100 are folded, so that the core 200 is accommodated between the body 100 and the folded long side ends. So, the core 200 reinforces the body 100.

Here, the core 200 may be made of one of various materials with flexibility, such as rubber, synthetic resin, or a metal plate, but it is preferable to be made of an eco-friendly material with flexibility. The eco-friendly material may be biodegradable plastics, and the paper may be craft paper or paper boards like the body 100.

One or more of the cores 200 which has length equal to or shorter than the long sides (L) of the body 100 are used, but the cores 200 may be longer than the long sides (L) of the body 100 to be used in a state where both ends are folded.

The core 200 may have a single layer as illustrated in FIG. 2(*a*), but may have multiple layers by being repeatedly folded as illustrated in FIG. 2(*b*). As shown in FIG. 2(*c*), a lot of sheets of cores 200 may form multiple layers in a form that one is put on another.

Both edges of the holding part 110 may be formed in a straight line since both the long sides L of the body 100 are folded at the predetermined width in a straight line, but may be formed to be curved with a predetermined curvature or may be formed in a waveform.

The body 100 has the catching parts 120 formed at both the short sides (S) to be symmetric to each other. The catching parts 120 are inserted into fitting holes 310 formed in the box 300, and are not easily separated from the fitting holes 310 in the reverse direction after being inserted into the fitting holes 310.

Each of the catching parts 120 according to the embodiment of the present invention has a first wing part 121 and a second wing part 123 formed when a plurality of points formed at predetermined intervals along a longitudinal direction of the long sides (L) are folded at right angles to the long sides (L) in the state where the ends of the long sides (L) of the body 100 are folded at the predetermined width.

Figure 3:
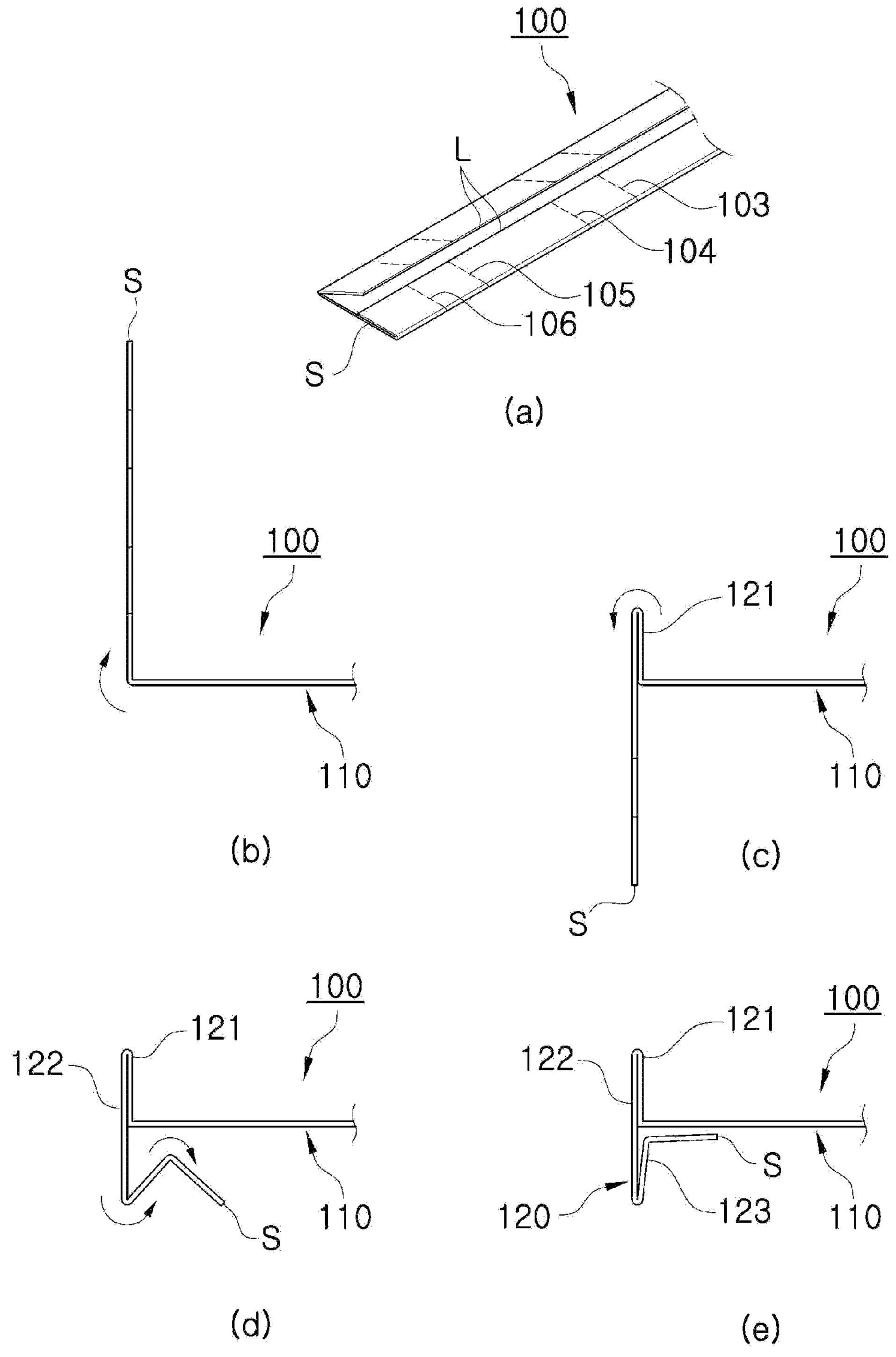
FIGS. 3(*a*), (*b*), (*c*), (*d*) and (*e*) are views illustrating a process of folding catching parts from a body of the paper handle according to an embodiment of the present invention.

That is, both the long sides (L) are folded inwardly, and then, one of the short sides (S) of the body 100 is bent as illustrated in FIG. 3(*a*). The short side (S) is bent upwardly at the first point which is close to the center of the body 100 as illustrated in FIG. 3(*b*), and is bent downwardly at the second point which has a uniform interval in the direction to go away from the center of the body 100 as illustrated in FIG. 3(*c*). Through the above, the first wing part 121 is formed. A support part 122 is formed from the second point to the third point which has a uniform interval in the direction to go away from the center of the body 100. After that, the short side is bent upwardly at the third point as illustrated in FIG. 3(*d*), and then, is bent downwardly at the fourth point which has a uniform interval in the direction to go away from the center of the body 100. So, the second wing part 123 is formed as illustrated in FIG. 3(*e*).

The first wing part 121, the support part 122, and the second wing part 123 are also formed at the other short side (S) of the body 100 to be symmetric.

Therefore, the support parts 122 of an approximately "|" shape, the first wing parts 121 of an approximately "└" shape located inside the support part 122, and the second wing parts 123 of an approximately "┌" shape are located at both sides of the body 100 to face each other. Over all, the catching parts 120 of an approximately "├" shape are formed at both sides of the body 100.

When the catching parts 120 are inserted into the fitting holes 310 of the box 300, any one of the first wing part 121 and the second wing part 123 gets closer to the body 100 so that the catching part 120 is formed in a straight line. After that, when the catching parts 120 are fit into the fitting holes 310, the first wing part 121 and the second wing part 123 go through the fitting holes 310. After that, the catching parts 120 return to their original state and are caught to the inside of the fitting holes 310. So, if the user does not pull the catching parts 120 by excessively external power, it is prevented that the catching parts 120 get out of the fitting holes 310.

Figure 4:
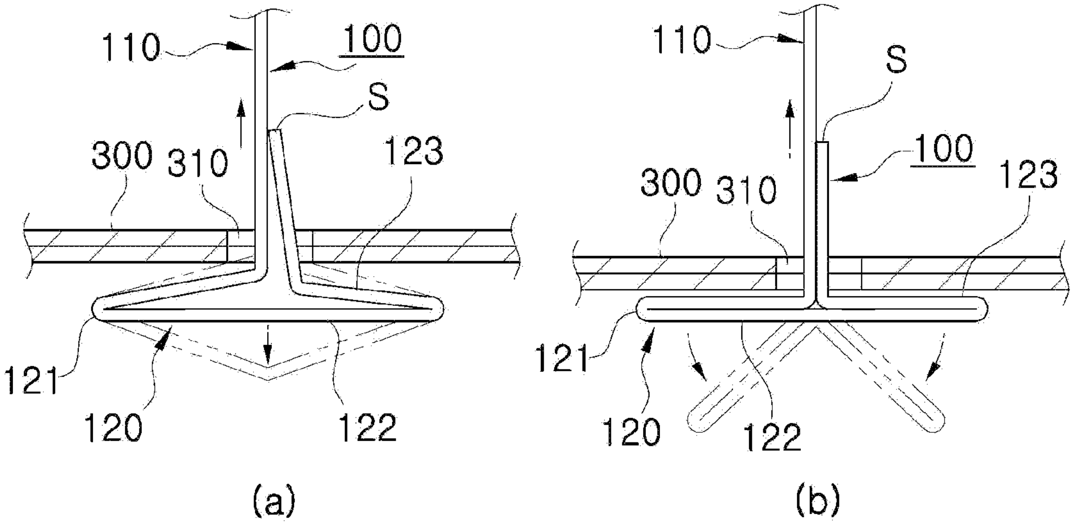
FIGS. 4(*a*) and (*b*) are views illustrating an example and another example of a first wing part and a second wing part of the catching parts of the body.

However, even though appropriate external power is applied through the holding part 110, since the external power applied through the holding part 110 is directly transferred to the first wing part 121, the first wing part 121 which is folded simply may be widened as illustrated in FIG. 4(*a*). Accordingly, as illustrated in FIG. 4(*a*), when the first wing part 121 is widened, since the catching parts 120 cannot fulfill their function, they may be separated from the fitting holes 310.

Therefore, as one embodiment, as illustrated in FIG. 4(*b*), the facing inner surfaces of the first wing part 121 and the second wing part 123 which are folded may be bonded together.

However, if the inner surfaces of the first wing part 121 and the second wing part 123 which are folded are all bonded, the catching parts can resist a predetermined external power applied to the holding part 110, but if excessively external power is applied, when the external power pulled through the holding part 110 pulls the first wing part 121, the first wing part 121 is not widened and power to resist is generated, but stress is focused on the bonded inner edge of the second wing part 123 by the power pulling the first wing part 121 and the support part 122. So, the support part 122 cannot maintain the straight state is deformed. Finally, the catching parts 120 are separated from the fitting holes 310.

Figure 5:
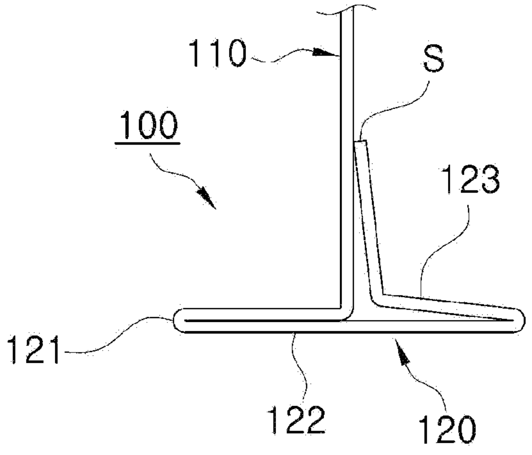
FIG. 5 is a view illustrating a further example of the first wing part and the second wing part of the catching parts of the body.

Therefore, as illustrated in FIG. 5, only the facing inner surfaces of the first wing part 121 are bonded but the facing inner surfaces of the second wing part 123 are not bonded, so that the second wing part 123 which has the unbonded inner surfaces serves as a buffer to disperse stress. So, it is prevented that the catching parts 120 are easily separated from the fitting holes 310, and strength of the catching parts 120 is increased.

Now, a manufacturing process of the paper handle for a box according to an embodiment of the present invention will be described.

Figure 6:
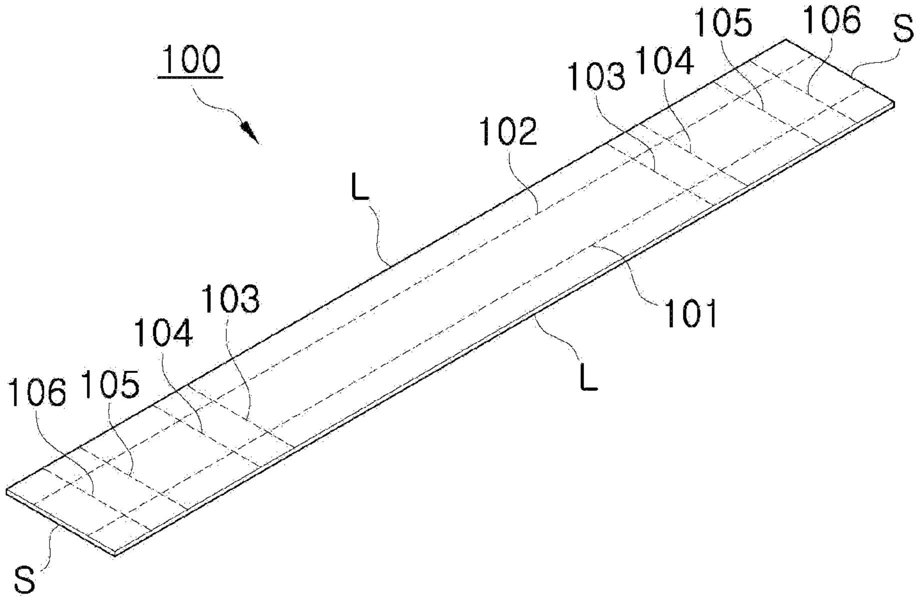
FIG. 6 is a perspective view illustrating the body having folding lines.

First, as illustrated in FIG. 6, a first step is carried out. In the first step, the body 100 of a rectangular shape having long sides (L) and short sides (S) is disposed in consideration of the grain direction. A first folding line 101 and a second folding line 102, which are spaced apart inwardly from the ends of the long sides (L) are formed at both sides of the long sides (L) of the body 100, and third folding lines 103, fourth folding lines 104, fifth folding lines 105, and sixth folding lines 106 which are formed at both short sides (S) of the body 100 to be symmetric are formed toward the short sides (S) from the center of the body 100 at predetermined intervals in sequence to be at right angles to the long sides (L).

Here, intervals among the end of the long side (L), the first folding line 101 and the second folding line 102 are adjusted appropriately according to the strength, form or shape of the body 100 and according to a manufacturer's intension, so that the ends facing when the ends of the long sides (L) are folded coincide with each other, are overlapped with each other, or are spaced apart from each other.

Furthermore, an interval between the third folding line 103 and the fourth folding line 104 is equal to an interval between the fifth folding line 105 and the sixth folding line 106, and the length of the first wing part 121 made along the third folding line 103 and the fourth folding line 104 is equal to the length of the second wing part 123 made along the fifth folding line 105 and the sixth folding line 106. Alternatively, the interval between the third folding line 103 and the fourth folding line 104 is larger than the interval between the fifth folding line 105 and the sixth folding line 106, and so, the first wing part 121 is longer than the second wing part 123.

Figure 7:
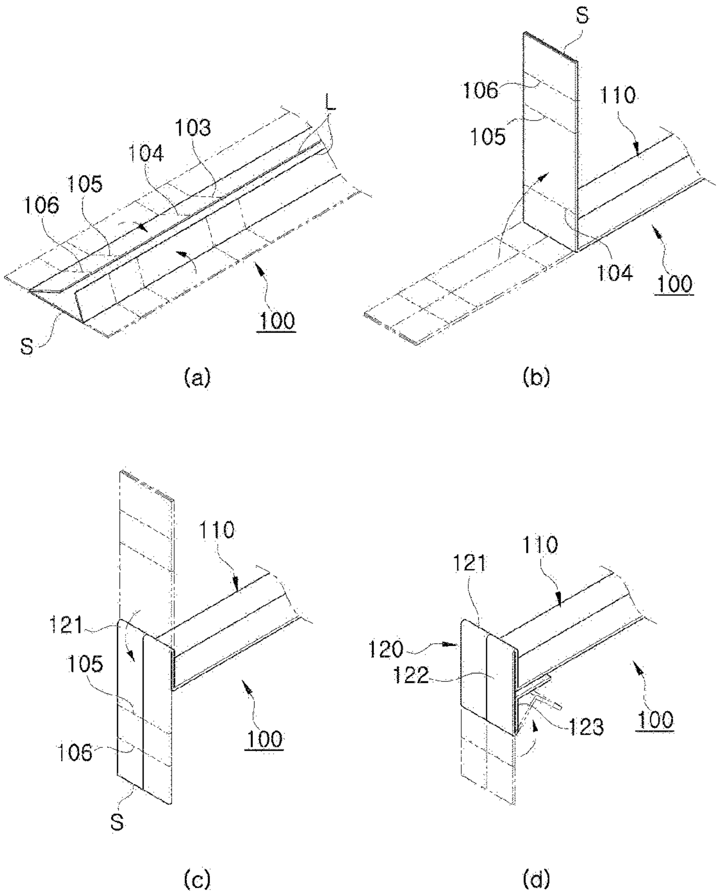
FIGS. 7(*a*), (*b*), (*c*) and (*d*) are perspective views illustrating a process of forming the catching parts by folding along the folding lines formed on the body.

After the first step of forming the folding lines 101, 102, 103, 104, 105 and 106 on the body 100, as illustrated in FIG. 7(*a*), a second step of folding the ends of the long sides (L) of the body 100 along the first folding line 101 and the second folding line 102 is carried out.

After the second step, a third step is carried out. after the ends of the long sides (L) of the body 100 are folded to face each other, in the third step, the short sides (S) of the body 100 are bent upwardly along the third folding lines 103 as illustrated in FIG. 7(*b*), are bent downwardly along the fourth folding line 104 as illustrated in FIG. 7(*c*), are bent upwardly along the fifth folding line 105 as illustrated in FIG. 7(*d*), and then, are bent downwardly along the sixth folding line 106.

In the third step, the first wing part 121 is formed when the short side (S) is bent upwardly along the third folding line 103 and bent downwardly along the fourth folding line 104, the support part 122 is formed between the fourth folding line 104 and the fifth folding line 105, and the second wing part 123 is formed when the short side is bent upwardly along the fifth folding line 105 and bent downwardly along the sixth folding line 106.

Additionally, in the third step, the inner surfaces facing when the short side (S) is bent upwardly along the third folding line 103 and bent downwardly along the fourth folding line 104 are bonded with each other in order to form the first wing part 121.

Moreover, in the second step, when the long sides (L) are folded to the body 100, the core 200 of a predetermined length is put on the surface of the body. Strength of the body 100 may be reinforced according to the installed condition and the structure of the core 200.

Figure 8:
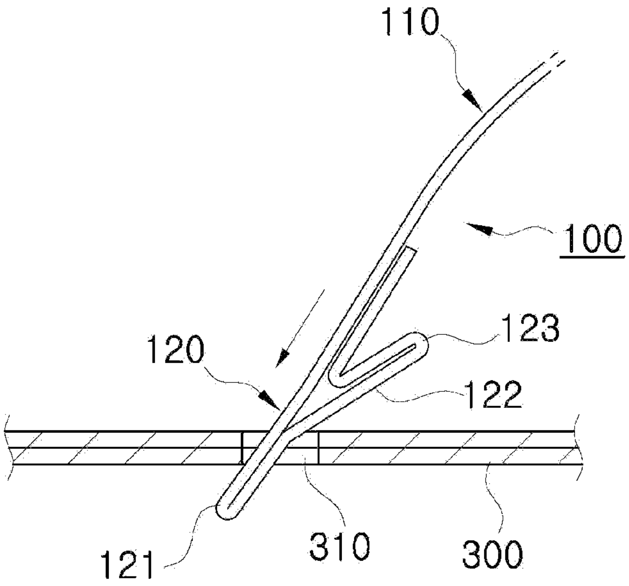
FIGS. 8(*a*) and (*b*) are enlarged sectional views illustrating processes before and after the catching parts formed on the body are fit into fitting holes of the box.
Figure 8:
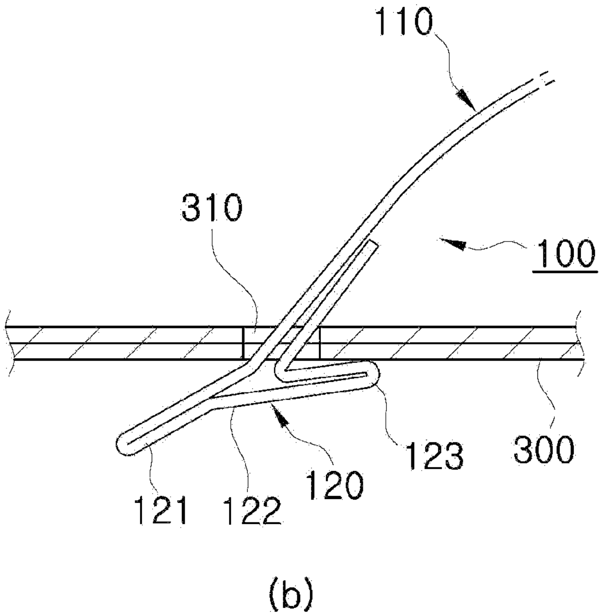
Figure 9:
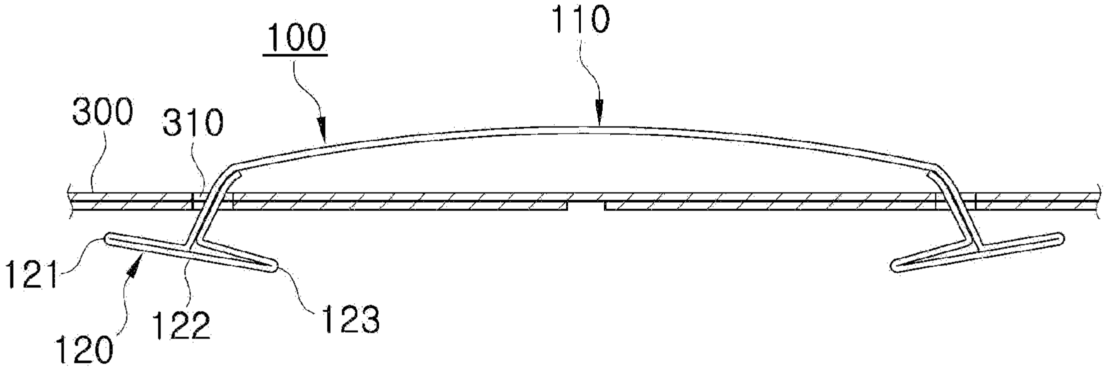
FIGS. 9(*a*) and (*b*) are sectional views illustrating a process of fitting the catching parts of the body into the fitting holes of the box.
Figure 9:
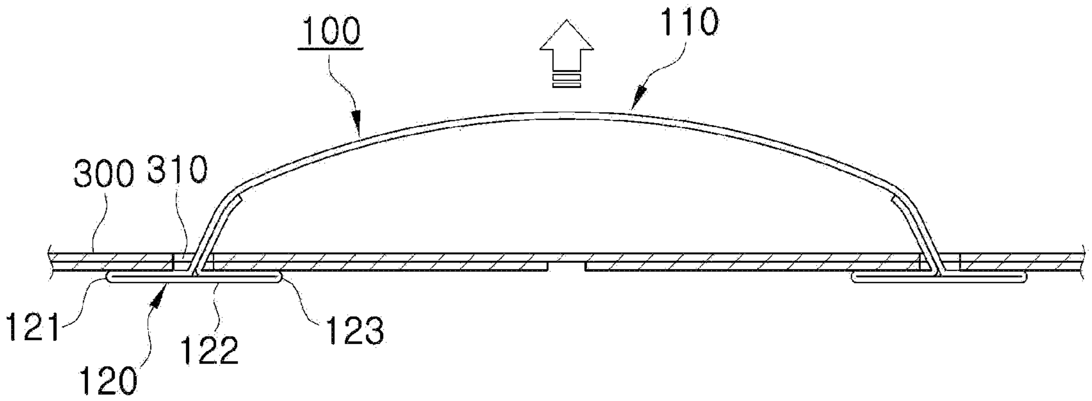
Figure 10:
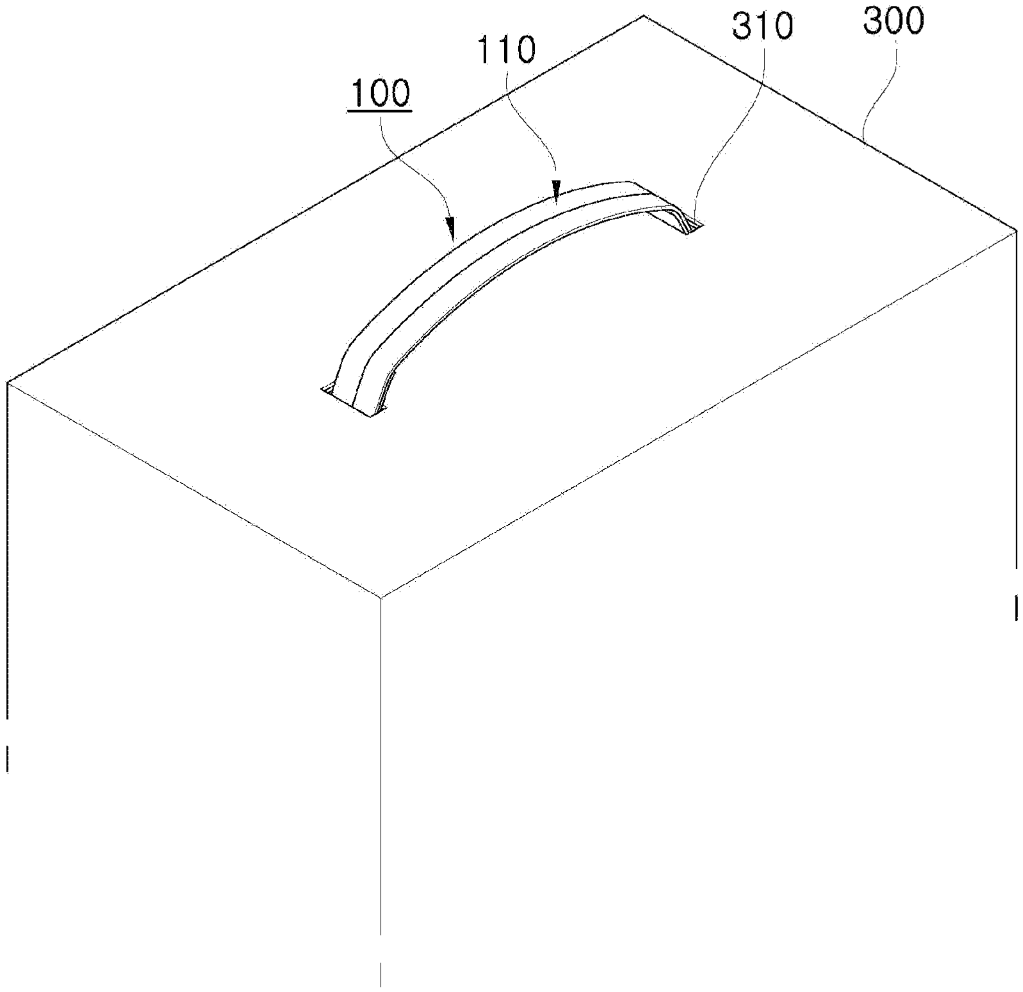
FIG. 10 is a perspective view illustrating a state where the paper handle is mounted on the box.

As described above, the paper handle according to the present invention includes the holding part 110 formed when paper is folded several times and the catching parts 120, which are formed at both sides of the holding part 110 and has the first wing part 121 and the second wing part 123. As illustrated in FIG. 8(*a*), the catching parts 120 are formed in a straight line when the first wing part 121 or the second wing part 123 gets in contact with the body 100 and is folded. After that, when the catching parts 120 are respectively inserted into the fitting holes 310 of the box 300, the first wing part 121 and the second wing part 123 fit into the fitting holes 310 are returned to their original state and are widened as illustrated in FIGS. 8(*b*) and 9(*a*), and then, are caught to the inner faces of the fitting holes 310 as illustrated in FIGS. 9(*b*) and 10. Therefore, because the paper handle is not easily separated from the box 300, the user can carry or move the box in safety.

Furthermore, because not only the box but also the handle is made of paper, the box and the handle can be discarded together without needing to separate the handle from the paper box after using the box.

While the present invention has been particularly shown and described with reference to exemplary embodiments thereof, it will be understood by those of ordinary skill in the art that various changes and modifications may be made therein without departing from the technical idea and scope of the present invention. Therefore, the scope of the disclosed contents should not be limited to the described embodiments, but should be determined by the appended claims and equivalents thereof.

| [Explanation of reference numerals] | |
|---|---|
| 100: body | 101: first folding line |
| 102: second folding line | 103: third folding line |
| 104: fourth folding line | 105: fifth folding line |
| 106: sixth folding line | 110: holding part |
| 120: catching part | 121: first wing part |
| 122: support part | 123: second wing part |
| 200: core | 300: box |
| 310: fitting hole | L: long side |
| S: short side | |

The invention claimed is:

1. A paper handle for a box which is inserted and fixed into fitting holes of a box, the paper handle comprising:
   - a body which has both long sides folded at a predetermined width to form at least two layers so that ends of the long sides face each other; and
   - catching parts respectively formed at both short sides of the body,
   - wherein each of the catching parts comprises a first wing part and a second wing part which are extended to each other and are formed when a plurality of points spaced apart at predetermined intervals in a longitudinal direction of the long sides are folded to be at right angles to the long sides, and
   - wherein at least one among the first wing part and the second wing part has inner surfaces which face each other and are bonded together in a folded state.

2. The paper handle according to claim 1, wherein the body is made of paper.

3. The paper handle according to claim 1, wherein the ends of the long sides of the body are folded at a predetermined width to face each other so that the ends of the long sides coincide with each other, are spaced apart from each other, or are overlapped with each other.

4. The paper handle according to claim 1, wherein the ends of the long sides of the body are folded at a predetermined width to face each other, and a core of a predetermined length is accommodated in the body.

5. The paper handle according to claim 4, wherein the core is made of paper, and is configured such that a single sheet of the core is folded in layers or many sheets of the core are put on another.

6. A manufacturing method of a paper handle for a box comprising:
   - a first step of forming a first folding line and a second folding line, which are spaced apart inwardly from the ends of the long sides of a body made of paper and formed in a rectangular shape having long sides and short sides,
   - and forming third folding lines, fourth folding lines, fifth folding lines, and sixth folding lines which are formed at both short sides of the body to be symmetric, are formed toward the short sides from the center of the body at predetermined intervals in sequence to be at right angles to the long sides;
   - a second step of folding ends of the long sides of the body inwardly along the first folding line and the second folding line; and
   - a third step of forming one or more catching parts by bending the short sides upwardly along the third folding line after the second step, bending the short sides downwardly along the fourth folding line, bending the short sides upwardly along the fifth folding line, and bending the short sides downwardly along the sixth folding line, wherein in the third step, the facing inner surfaces of the short sides are bonded together while the short sides are bent upwardly along the third folding line and bent downwardly along the fourth folding line to form at least one among a first wing part and a second wing part of the one or more catching parts.

7. The method according to claim 6, wherein in the second step, when the ends of the long sides of the body are folded at a predetermined width to face each other, the body is folded in a state where a core of a predetermined length is put in the body.

* * * * *